(12) United States Patent
Nakayasu

(10) Patent No.: US 6,446,599 B1
(45) Date of Patent: Sep. 10, 2002

(54) IDLE SPEED CONTROL FOR ENGINE

(75) Inventor: Yoshikazu Nakayasu, Shizuoka (JP)

(73) Assignee: Sanshin Kogyo Kabushiki Kaisha, Shizuoka-ken (JP)

( * ) Notice: Subject to any disclaimer, the term of this patent is extended or adjusted under 35 U.S.C. 154(b) by 0 days.

(21) Appl. No.: 09/422,305

(22) Filed: Oct. 21, 1999

(30) Foreign Application Priority Data

Oct. 28, 1998 (JP) ............................................. 10-307256
Oct. 28, 1998 (JP) ............................................. 10-307269
Feb. 22, 1999 (JP) ............................................. 11-043444

(51) Int. Cl.$^7$ ............................................. F02D 41/16
(52) U.S. Cl. ................................................. 123/339.23
(58) Field of Search ........................ 123/339.23, 339.19

(56) References Cited

U.S. PATENT DOCUMENTS

| | | | |
|---|---|---|---|
| 4,924,834 A | * 5/1990 | Bonfiglioli et al. | ......... 123/470 |
| 5,146,888 A | 9/1992 | Sawamoto | ................... 123/336 |
| 5,522,362 A | * 6/1996 | Motose | ................... 123/339.13 |
| 5,649,512 A | 7/1997 | Flanery et al. | ......... 123/339.23 |
| 5,769,060 A | 6/1998 | Matsumoto | ................... 123/585 |
| 5,873,332 A | 2/1999 | Taue et al. | ................... 123/52.4 |
| 5,975,032 A | * 11/1999 | Iwata | ....................... 123/41.31 |
| 6,041,754 A | * 3/2000 | Mori et al. | ............. 123/339.23 |

FOREIGN PATENT DOCUMENTS

| | | |
|---|---|---|
| GB | 2 321 085 | 7/1998 |
| JP | 61-93228 | * 5/1986 |
| JP | 3-121266 | * 5/1991 |

* cited by examiner

*Primary Examiner*—Tony M. Argenbright
(74) *Attorney, Agent, or Firm*—Knobbe, Martens, Olson & Bear, LLP

(57) ABSTRACT

An idle speed control for an engine includes an improved construction. An air induction system for the engine has a plurality of main air intake passages. Each one of the intake passages has its own throttle valve therein. An idle air manifold is disposed for supplying air charges to combustion chambers of the engine through delivery conduits. Amounts of air charges flowing therethrough is controlled by a feedback control system. The sum of cross-sectional areas of the delivery conduits is greater than a cross-sectional area of an inlet portion of the idle air manifold. The respective delivery conduits have restrictions upstream of junctions to the air intake passages.

42 Claims, 12 Drawing Sheets

IDLE SPEED CONTROL FOR ENGINE

BACKGROUND OF THE INVENTION

1. Field of the Invention

This invention relates to an idle speed control for an engine, and more particularly to an improved idle speed control of an engine that is provided with an idle speed controller (ISC).

2. Description of Related Art

Internal combustion engines generally—have include air induction systems that supply air charges to combustion chambers. The air induction systems usually comprises a single main air intake passage or a plurality of main air intake passages. Throttle valves are provided therein to control amounts of air supplied to the combustion chambers. The throttle valves are generally operated by throttle control mechanisms such as accelerator pedals for automobiles and throttle levers for outboard motors.

The engines are operated often under no load, i.e., in an idle state. For instance, generally the engines require to be warmed up for a while after started without any load. Also, the operator may wish to stay an associated vehicle or watercraft without stopping the engine operations. Under the idling condition, the throttle valve is closed and hence no air charges are supplied to the combustion chamber through the main air intake passages. In order not to stop the operations, the engines must keep their own idle speeds. The engines, thus, include idle air passages additionally to the main air intake passages in the air induction systems. The idle air passages bypass the main air intake passages and communicate to combustion chambers of the engines as well as the main air intake passages.

In other occasions such as an engine start, warming up or running under very low atmospheric temperature or preventing the engine from stalling when decelerated, the engine needs a larger amount of air than under the usual idle conditions described above even the throttle control mechanism is not operated.

Conventionally, an amount of air supplied to the combustion chamber through the idle air passage to maintain the idle speed is regulated by a mechanical control system. Although the mechanical control system is simple, it is difficult to change air amounts in response to the various conditions. However, as great results of developments in connection with electronic control systems in recent years, an idle speed controller (ISC) is now added to the conventional control systems.

The ISC is a feedback control system. In this system, the idle air passage has an idle throttle valve therein. An actual idle speed is sensed by a crankshaft angle position sensor associated with a crankshaft of the engine. Meanwhile, an electronic control device stores a preset idle speed in its control map. When the actual idle speed is sensed, a signal is sent to the control device and compared with the preset idle speed. If the actual idle speed is greater than the preset idle speed, the control device will activate the idle throttle valve toward the closed position. If the actual speed is smaller than the preset speed, the control device will activate it toward the open position. The actual idle speed is accordingly maintained as almost equal to the preset idle speed. Since the control device can store multiple preset idle speeds, the ISC is quite suitable for controlling the idle throttle valve in the idle air passage under the various conditions.

On the other hand, some engines are provided with a plurality of air intake passages as noted above. Conventionally, an air manifold is provided upstream of the respective air intake passages and a common throttle valve is placed therein. Also, a single ISC is provided on an idle air passage which bypasses the throttle valve. Because this arrangement only has the single ISC, a control method for the ISC is simple. However, it requires, upstream of the air manifold, a relatively large plenum chamber in which air charges to the respective intake passages are coordinated not to interfere with each other.

Another arrangement is proposable. In this arrangement, all of the air intake passages include their own throttle valves therein separately and a plurality of idle air passages bypass the respective intake passages. In addition, each idle air passage is provided with an ISC separately. This arrangement does not need a large space for the abovenoted plenum chamber. However, the multiple ISCs, in turn, require separate controls because intake air pressures in the respective idling air passages are different from each other. Accordingly, separate control maps for the ISCs are necessary in this arrangement.

It is, therefore, a principle object of this invention to provide an engine that has a relatively compact air intake system and an ISC which can be easily controlled.

Also, if an engine has a single ISC for multiple idle air passages, air charge must be collected to the ISC and then delivered to respective combustion chambers. In this arrangement, if the delivered air charges flow rapidly in respective delivery conduits which are placed between the ISC and the respective combustion chambers, they are likely to be irregular relative to each other. As a result, the idle control by the single ISC will be unstable.

It is, therefore, another object of this invention to provide an engine that will not cause any unstable condition of an ISC even it is a single one.

Further, outboard motors, of course, may have engines which incorporate the ISC. When the ISC is incorporated in an outboard motor, another problem appears.

The outboard motor generally comprises a drive unit and a bracket assembly. The drive unit is mounted on a transom of an associated watercraft by the bracket assembly for pivotal movement about a steering axis and also about a tilt axis. The drive unit includes a power head in which the engine is placed, a driveshaft housing depending from the power head and a lower unit further depending from the driveshaft housing. The engine has an output shaft extending generally vertically. The output shaft drives a driveshaft extending generally vertically within the driveshaft housing toward the lower unit. The driveshaft, in turn, drives a propeller shaft extending generally horizontally within the lower unit through a forward, neutral and reverse transmission. The propeller shaft then drives a propulsion device such as a propeller. A shift device is provided to switchover the transmission among a forward, neutral and reverse positions. A large part of current outboard motors employ dog clutches for switchover mechanisms.

If the ISC, for example, malfunctions and increases air amounts that flow through the idle air passages without any limitation, the idle speed becomes so fast that the shift operation from the neutral position to the forward or reverse position and vice versa tends to be difficult or impossible. The switchover mechanism incorporating the dog clutch is likely to cause this accident. Also, the outboard motor is sometimes operated in the forward position with the idle speed. This is a trolling condition and the associated watercraft advances quite slowly. The inconvenience situation particularly has an inclination to happen when the switchover mechanism is operated from the forward position under this condition to the neutral position. If the idle speed exceeds over a certain range, the switchover action will be impossible.

Further, in the event of dislocation or damage of delivery conduits, non-controlled and large amounts of air will be supplied to the combustion chambers. Under this condition, the large amounts of air flow into the combustion chambers and then the idle speed surely exceeds a permissible range and the shift action of the switchover mechanism will become impossible also. The same problem may occur in seizure or damage of the ISC.

It is, therefore, a further object of this invention to provide an engine in which an idle speed will not exceed a permissible range on any occasions.

SUMMARY OF THE INVENTION

In accordance with one aspect of the present invention, an internal combustion engine comprises a cylinder body defining a plurality of cylinder bores in which pistons reciprocate. A cylinder head is affixed to an end of the cylinder body and defining combustion chambers with the pistons and the cylinder bores. A plurality of air intake passages are provided for supplying air charges to the combustion chambers. Each one of the air intake passages includes a throttle valve arranged to control an amount of the air charge that flows through each one of the air intake passages. An idle air manifold is also provided for supplying air charges to the combustion chambers. A feedback control system is arranged to control amounts of the air charges that flow through the idle air manifold based upon a difference between a preset idle speed and an actual idle speed of the engine.

In accordance with another aspect of the present invention, an internal combustion engine comprising a cylinder body defining at least one cylinder bore in which a piston reciprocates. A cylinder head affixed to an end of the cylinder body and defining a combustion chamber with the piston and the cylinder bore. At least one air intake passage is provided for supplying an air charge to the combustion chamber. The the air intake passage includes a throttle valve arranged to control an amount of the air charge that flows through the air intake passage. An idle air passage bypasses the throttle valve to deliver idle air to the combustion chamber. An idle air control system is arranged to control an amount of an air charge that flows through the idle air passage. The idle air passage has a fixed cross-sectional area through which an amount of air is regulated.

In accordance with a further aspect of the present invention, an internal combustion engine comprises a cylinder body defining a plurality of cylinder bores in which pistons reciprocate. A cylinder head is affixed to an end of the cylinder body and defining combustion chambers with the pistons and the cylinder bores. A plurality of air intake passages are provided for supplying air charges to the combustion chambers. Each one of the air intake passages includes a throttle valve arranged to control an amount of the air charge that flows through each one of the air intake passages. An idle air passage bypasses the throttle valves to deliver idle air to the combustion chambers. An idle air control system is arranged to control an amount of an air charge that flows through the idle air passage. The idle air passage includes an idle air manifold having an inlet portion and a plurality of idle air delivery conduits. The idle air delivery conduits diverge from the idle air manifold and communicate with the respective air intake passages. The sum of cross-sectional areas of the idle air delivery conduits is greater than a cross-sectional area of the inlet of the idle air manifold.

Further aspects, features and advantages of this invention will become apparent from the detailed description of the preferred embodiments which follow.

BRIEF DESCRIPTION OF THE DRAWINGS

These and other features of this invention will now be described with reference to the drawings of preferred embodiments which are intended to illustrate and not to limit the invention.

DETAILED DESCRIPTION OF THE PREFERRED EMBODIMENTS OF THE INVENTION

Figure 1:
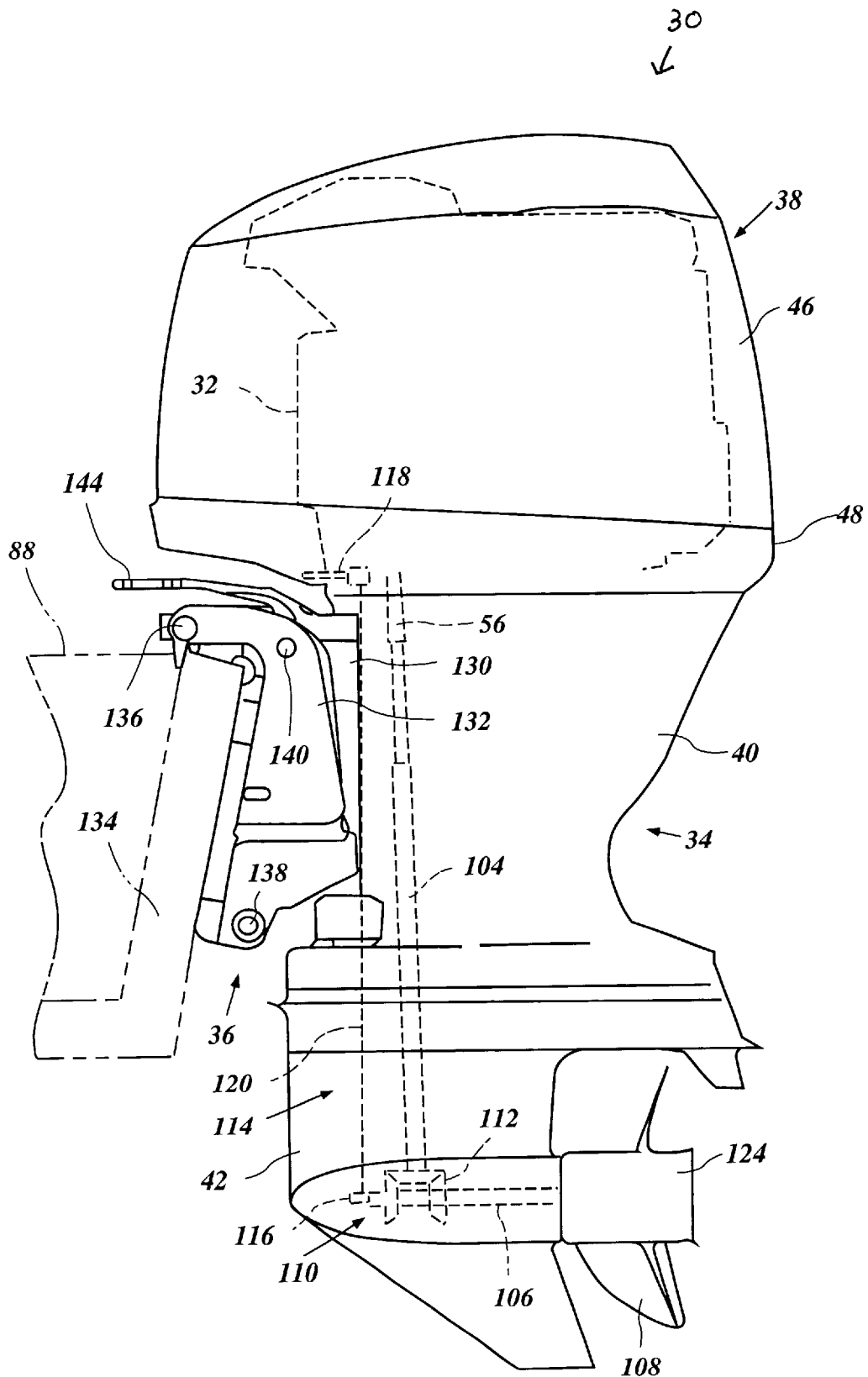
FIG. 1 is a side elevational view showing an outboard motor in accordance with a first embodiment of this invention. An associated watercraft is partially shown in phantom.
Figure 2:
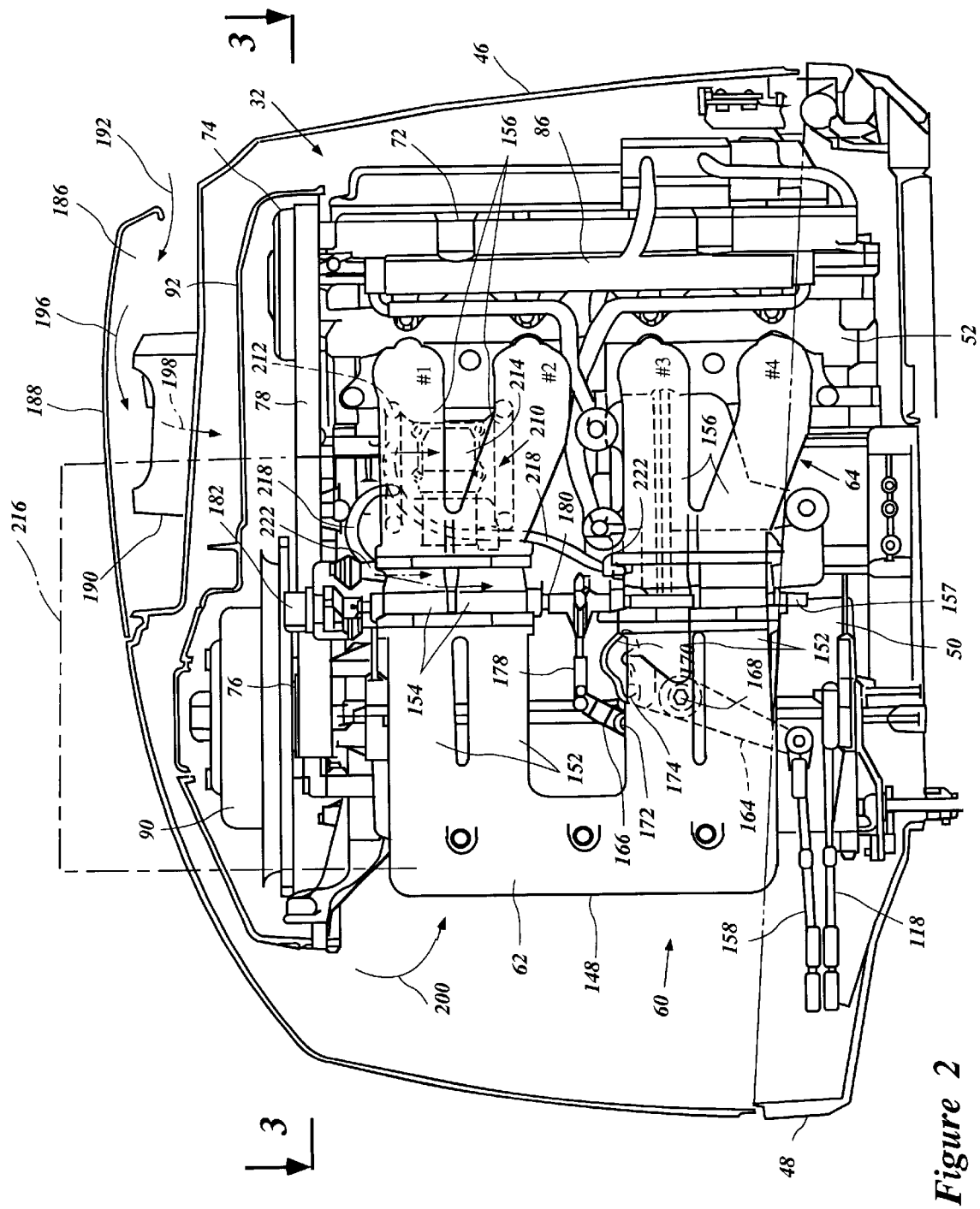
FIG. 2 is an enlarged side elevational view showing a power head of the outboard motor.
Figure 3:
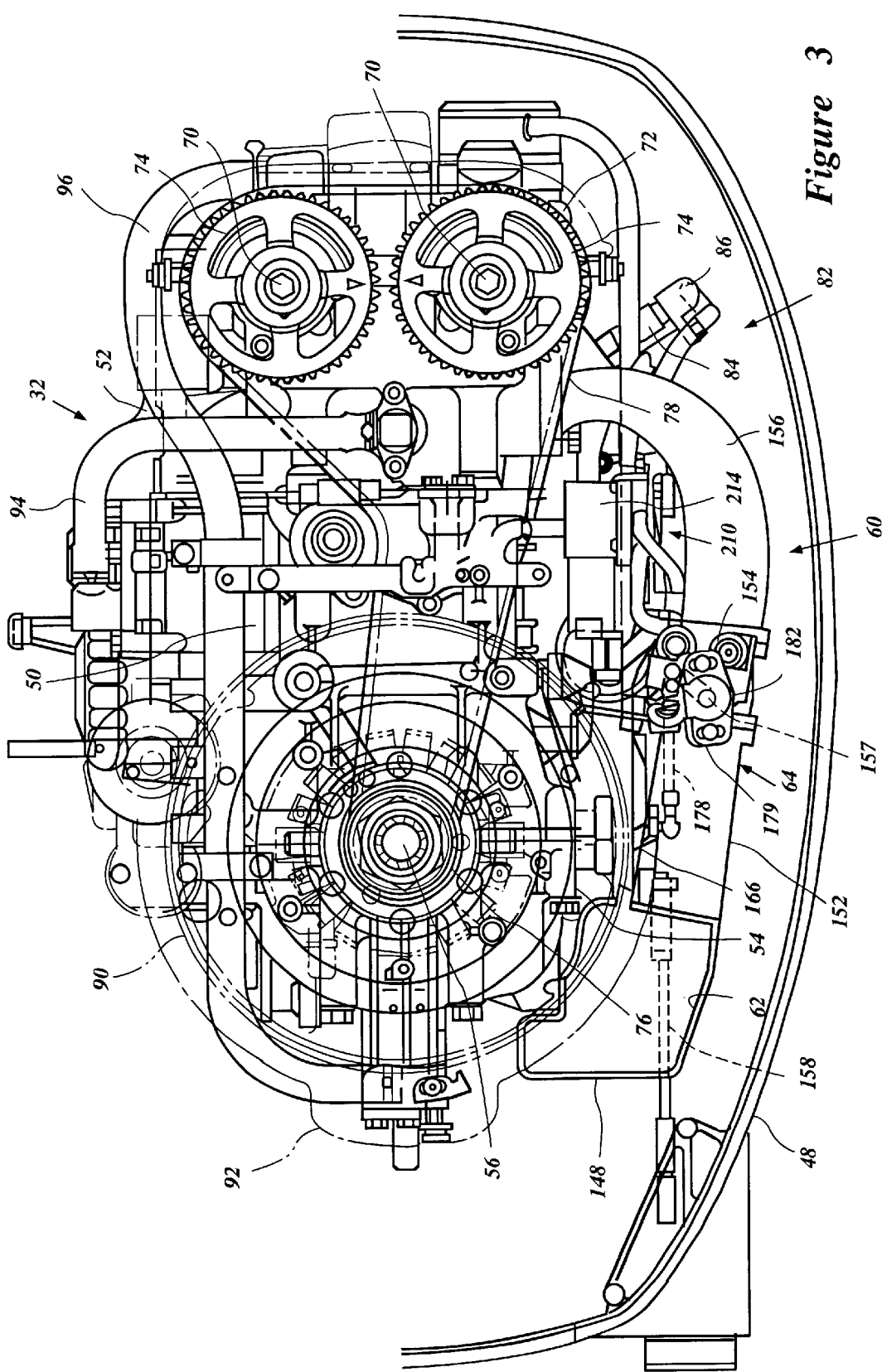
FIG. 3 is an enlarged top plan view, generally taken from the line 3—3 in FIG. 2, showing the power head. A flywheel and a cover member which exist above the line 3—3 are also shown in phantom.

With reference to FIGS. 1 to 3, an outboard motor, designated generally by reference numeral 30, includes an internal combustion engine 32 arranged in accordance with a first embodiment of the present invention. Although the present invention is shown in the context of an engine for an outboard motor, various aspects and features of the present invention also can be employed with other engines such as for automobiles and motorcycles.

In the illustrated embodiment, the outboard motor 30 comprises a drive unit 34 and a bracket assembly 36. The drive unit 34 includes a power head 38, a driveshaft housing 40 and a lower unit 42. The power head 38 is disposed atop of the drive unit 34 and includes the engine 32, a top protective cowling 46 and a bottom protective cowling 48.

The engine 32 operates on a four stroke cycle principle and powers a propulsion device. As seen in FIGS. 2 and 3, the engine has a cylinder body 50. Although not shown, the cylinder body 50 defines four cylinder bores generally horizontally extending and spaced generally vertically with each other. A piston can reciprocate in each cylinder bore. A cylinder head member 52 is affixed to one end of the cylinder body 50 and defines four combustion chambers with the pistons and the cylinder bores. The other end of the cylinder body 50 is closed with a crankcase member 54 defining a crankcase chamber with the cylinder bores. A crankshaft or output shaft 56 extends generally vertically through the crankcase chamber. The crankshaft 56 is pivotally connected with the pistons and rotates with the reciprocal movement of the pistons. The crankcase member 54 is located at the most forward position, then the cylinder body 50 and the cylinder head member 52 extends rearwardly from the crankcase member 54 one after another.

The engine 32 includes an air induction system 60 and exhaust system (not shown). The air induction system 60 is arranged to supply air charges to the combustion chambers and comprises a plenun chamber 62, four main air intake passages 64 and intake ports. The intake ports are defined in the cylinder head assembly 52 and opened or closed by intake valves. When the intake ports are opened, the air intake passages 64 communicate with the combustion chambers. The air induction system 60 will be described in more detail later. The exhaust system is arranged to discharge burnt charges or exhaust gasses from the combustion chambers to outside of the outboard motor 30. Exhaust ports are defined in the cylinder head assembly 52 also and opened or closed by exhaust valves. When the exhaust ports are opened, the combustion chambers communicate with exhaust passages which lead the exhaust gasses downstream of the exhaust system.

Two camshafts 70 extend generally vertically to activate the intake valves and exhaust valves. The camshafts 70 has cam lobes thereon to push the intake and exhaust valves at certain timings to open or close the respective ports. The camshaft 70 are journaled between the cylinder head member 52 and a cylinder head cover member 72.

The camshafts 70 are driven by the crankshaft 56. The respective camshafts 70 have cogged pulleys 74 thereon, while the crankshaft 56 also has a cogged pulley 76 thereon. A cogged belt or chain 78 is wound around the cogged pulleys 74, 76. With rotation of the crankshaft 56, therefore, the camshaft 70 rotate also.

The engine 32 has a direct fuel injection system 82. The fuel injection system 82 includes four fuel injectors 84 and fuel delivery conduits 86. A fuel supply tank (not shown) is placed in the hull of the associated watercraft 88 (see FIG. 1). The fuel contained in the fuel supply tank is supplied to low pressure fuel pumps and a high pressure fuel pump both placed on the outboard motor 30 to be pressurized by them. The pressurized fuel is, then, delivered through the delivery conduits 86 to the fuel injectors 84. The fuel is sprayed into the combustion chambers every proper timing. The injection timing is controlled by an electronic control unit (ECU) which will be described later.

Although not shown, the engine 32 further has a firing system. Four spark plugs are exposed into the respective combustion chambers and fire an air fuel charge at preset timings. This firing timing is also controlled by the ECU. The air fuel charges are formed with air charges supplied by the main air intake passages 64 and fuel charges sprayed by the fuel injectors 84 in usual states of engine operations. However, in an idle state, air charges are delivered through an idle air passage, which will be described later, and mixed with the fuel charges sprayed by the fuel injectors 84.

A flywheel assembly 90 is affixed atop the crankshaft 56. The flywheel assembly 90 includes a generator to supply electric power to the firing system, the ECU and other electrical equipment. A cover member 92 covers the flywheel assembly 90 as well as the pulleys 74, 76 and the belt 78 for protection of the operator from such moving parts.

Additionally, the engine 32 has a water discharge pipe 94 through which cooling water is discharged and a blow-by gas passage 96 through which blow-by gasses returns to the crankcase chamber from recesses formed in the cylinder head member 52.

Returning back to FIG. 1, the top and bottom cowlings 46, 48 generally completely enclose the engine 32. The top cowling 46 is detachably affixed to the bottom cowling 48 so that the operator can access to the engine 32 for maintenance or other purposes.

The driveshaft housing 40 depends from the power head 38 and supports a driveshaft 104 which is driven by the crankshaft 56 of the engine 32. The driveshaft 104 extends generally vertically through the driveshaft housing 40. The driveshaft housing 40 also defines internal passages which form portions of the exhaust system.

The lower unit 42 depends from the driveshaft housing 40 and supports a propeller shaft 106 which is driven by the driveshaft 104. The propeller shaft 106 extends generally horizontally through the lower unit 42. In the illustrated embodiment, the propulsion device includes a propeller 108 that is affixed to an outer end of the propeller shaft and is driven by the propeller shaft 106. A transmission 110 is provided between the driveshaft 104 and the propeller 106. The transmission 110 couples together the two shafts 104, 106 which lie generally normal to each other (i.e., at a 90° shaft angle) with a bevel gear combination 112. The transmission 110 has a switchover mechanism 114 to shift rotational directions of the propeller 108 to forward, neutral or reverse. The switchover mechanism 114, although it is rather schematically illustrated, includes: a dog clutch 116, a shift cable 118 disposed in the protective cowlings 46, 48. A shift rod 120 extending generally vertically is also included in the switchover mechanism 114 to connect the dog clutch 116 with the sift cable 118. The shift cable 118 extends outwardly from the protective cowlings 46, 47 so as to be operated by the operator. Actually, the shift rod 120 extends through a swivel bracket, which will be described shortly, and the lower unit 42. The switchover mechanism 114 is operable at certain engine speeds less than a predetermined speed which will be described later.

The lower unit 42 also defines an internal passage that forms a discharge section of the exhaust system. At engine speed above idle, the majority of the exhaust gasses are discharged to the body of water surrounding the outboard motor 30 through the internal passage and finally through a hub 124 of the propeller 108, as well known in the art.

The bracket assembly 36 comprises a swivel bracket 130 and a clamping bracket 132. The swivel bracket 130 supports the drive unit 34 for pivotal movement about a generally vertically extending steering axis. The clamping bracket 132, in turn, is affixed to a transom 134 of the associated watercraft 88 and supports the swivel bracket 130 for pivotal movement about a generally horizontally extending tilt axis, i.e., the axis of a pivot shaft 136.

As used through this description, the terms "fore," "forward,' "front," and "forwardly mean at or to the side where the clamping bracket 132 is located, and the terms "rear," "reverse", "back," and "rearwardly" mean at or to the opposite side of the front side, unless indicated otherwise.

Although not shown, a hydraulic tilt system is provided between the swivel bracket 130 and the clamping bracket 132. The hydraulic tilt system may have various arrangements. However, it basically comprises a cylinder housing, a tilt piston slidably supported in the cylinder housing and a piston rod extending from the tilt piston beyond the cylinder housing. The bottom end of the cylinder housing is affixed to the clamping bracket 132 for pivotal movement about a generally horizontally extending axis, i.e., the axis of a pivotal shaft 138. The upper end of the piston rod is affixed to the swivel bracket 130 for pivotal movement about a generally horizontally extending axis, i.e., the axis of a pivotal shaft 140. A powering assembly is also provided for pressurizing working fluid to move the tilt piston up and down within the cylinder housing. With this movement, the piston rod is expanded or contracted to tilt up or down. Thus, the drive unit 40 as well as the swivel bracket 130 is tilted up and down.

A steering handle 144 extends from the swivel bracket 130 forwardly so that the operator can steer the outboard motor 30 in the associated watercraft 88. A throttle control lever (not shown) is also attached to the steering handle 144. Throttle valves which will be described later can be operated by the operator with this throttle lever.

With reference to FIGS. 2 and 3, the air induction system 60 will be described in more detail.

The plenum chamber 62 is defined in a plenun chamber member 148 positioned on the port side of the crankcase member 54. The main air intake passages 64 extend rearwardly from the plenum chamber member 148 along the cylinder body 50 and then bend toward the intake ports. The plenum chamber member 148 has an inlet opening, although it is not shown, at its front side and the plenum chamber 62 defined therein functions as an intake silencer and/or an coodination of air charges. The air intake passages 64 are actually defined by duct sections 152 which are uniformly formed with the plenum chamber member 148, throttle bodies 154 and runners 156. The upper two throttle bodies 154 are unified with each other. The upper two runners 56, in turn, are uniformly formed with each other at their fore portions and then forked into two portions. The lower two throttle bodies 154 and runners 156 have the same constructions as the upper two throttle bodies 154 and runners 156. The air intake passages 64 comprising these members 152, 154, 156 extend generally horizontally along the respective cylinder bores and spaced generally vertically with each other. As indicated in FIG. 2, the air intake passages 64 are numbered as #1 through #4 from the top to the bottom for convenience' sake in this description.

The respective throttle bodies 154 support butterfly-type throttle valves (not shown) therein for pivotal movement about axes of valve shafts extending generally vertically. The valve shafts are linked together to be a single valve shaft 157 that passes through all of the throttle bodies 154. The throttle valves are operable by the operator with the aforenoted throttle control lever through a throttle cable 158 and a non linear control device 160.

The non-linear control device 160 includes a first lever 164 and a second lever 166 joined together with each other by cam connection. The first lever 164 is pivotally connected to the throttle cable 158 and pivotally connected to a first pin 168 which is affixed to the cylinder body 50. The first lever 164 has a cam hole 170 at the opposite end of the connection with the throttle cable 158; The second lever 166 is generally shaped as the letter "L" and pivotally connected to a second pin 172 which is affixed to the crankcase member 54. The second lever has a pin 174 that interfits the cam hole 170. The other end of the second lever 166 is pivotally connected to a control rod 178. The control rod 178, in turn, is pivotally connected to a lever member 179. The lever member 179 is, then, connected to the throttle valve shaft 157 via a coil spring 180 that urges the control rod 178 to be at a position as shown in FIG. 2. At this position of the control rod 178, the throttle valve shaft 157 is in a closed position wherein no air charge can pass through the air intake passages 64.

When the throttle cable 158 is operated, the first lever 164 pivots about the first pin 168 anti-clockwise in FIG. 2. The second lever 166, then, pivots about the second pin 172 clockwise. Since the pin 174 of the second lever 166 is intermitted in the cam hole 170, the second lever 166 moves along this cam shape. Then, the second lever 166 pushes the control rod 178 against the urge of the coil spring 180 to open the throttle valves. When the throttle cable 158 is released, the control rod 178 returns to the initial position by the force of the spring 180 and the throttle valves are closed again.

A throttle valve position sensor 182 is placed atop of the throttle valve shaft 157. A signal from the position sensor 182 is sent to the ECU for both of the fuel injection control and the firing control.

As seen in FIG. 2, the top cowling 46 defines a pair of air intake compartments 186 with compartment members 188 and recesses at both rear sides thereof. Each air intake compartment 186 has an air funnel 190 that stands in the compartment 186. The air intake compartments 186, thus, communicate with the interior of the protective cowlings 46, 48.

Air is introduced, at first, into the air intake compartments 186 as indicated by the arrow 192 and enters into the interior of the cowlings 46, 48 through the air funnels 190 as indicated by the arrows 196, 198. Then, the air goes down to the inlet opening of the plenum chamber member 148 as indicated by the arrow 200 and enters into the plenum chamber 62. The plenum chamber 62 attenuates intake noise and delivers air charges to the respective duct sections 152. Amounts of the air charges are controlled by the throttle valves in the throttle bodies 154 to meet the requirements for operational conditions of the engine 32. The adjusted air charges are, then, go to the runners 156 and finally reach the intake ports. As described above, the intake valves are provided at these intake ports. Since the intake valves are opened intermittently by the cam lobes of the camshafts 70, the air charges are finally supplied to the combustion chambers when the intake valves are opened.

The air induction system 60 further includes an idle air supply unit 210. With still reference to FIGS. 2 and 3, the idle air supply unit 210 in accordance with a first embodiment of the present invention will be described.

The idle air supply unit 210 is located between the cylinder body 50 and the main air intake passages 64. Actually, the idle air supply unit 210 is affixed to the #1 and #2 runners 156. This is effective because the heat in the cylinder body 50 does not conducted to the idle air supply unit 210. The idle air supply unit 210 comprises an idle air manifold 212 and idle speed controller (ISC) 214. Although a detailed description in connection with the construction of the idle air supply unit 210 will be made with reference to FIG. 4 shortly, an inlet bypass 216, which is shown schematically with the phantom line in FIG. 2, connects the plenum chamber 62 with the idle air manifold 212. A housing of the ISC 214 includes a through-passage therein. The through passage communicates with the idle air manifold 212. A pair of outlet bypasses 218 connect the idle air manifold 212 with bypass inlet ports 222 which are positioned on the #1 throttle body 154 and #3 throttle body 154 downstream of the main throttle valves. The outlet bypasses 218 are delivery conduits and made of elastic material such as synthetic rubber. The inlet port 222 on the #1 throttle body 154 communicates with the #2 throttle body 154 by an internal passage as well as the #1 throttle body 154. This is shown schematically again with the dotted arrows in FIG. 2. The other inlet port 222 on the #3 throttle body 154, in turn, communicates with the #4 throttle body 154 by another internal passage as well as the #3 throttle body 154, although this is not shown.

The sum of cross-sectional areas of the outlet bypasses 218 is greater than a cross-sectional area of the inlet bypass 216, more specifically, a cross-sectional area of the inlet portion of the inlet bypass 216 to the housing of the ISC 214.

The housing of the ISC 214 has an idle throttle valve therein that is a butterfly type and placed in the through-passage. The opening of the idle throttle valve is controlled by the ECU. The term "idle speed controller" or "ISC" includes the control by the ECU. The pure mechanical part of the ISC including the housing and excluding the control by the ECU will be called as an "idle air control mechanism" in this description and Claims.

The ISC 214 is a feedback control system. An actual idle speed is sensed by a crankshaft angle position sensor (not shown) which is provided associated with the crankshaft 56. The crankshaft angle position sensor outputs a crankshaft rotational speed signal or engine speed signal. The engine speed at an idle state is the idle speed. That is, the engine 32 operates under substantially no load in the idle state. More specifically, the changeover mechanism 114 is in the neutral position. Otherwise, the changeover mechanism 114 is in a forward position but the throttle control lever is not operated and the propeller 108 simply rotates in the trolling mode. The actual idle speed changes generally in proportion to the amounts of air charges that is regulated by the ISC 214.

Meanwhile, the ECU stores preset idle speeds in its control map. When the actual idle speed is sensed by the crankshaft angle position sensor, a signal is sent to the ECU and compared with one of the preset idle speeds by the ECU. If the actual idle speed is greater than the preset idle speed, the ECU will activate the idle throttle valve toward the closed position. If the actual speed is smaller than the preset speed, the control device will activate it toward the open position. The actual idle speed is accordingly maintained as almost equal to the preset idle speed. The ECU can store multiple preset idle speeds which meet with various engine conditions including the engine start, the usual engine warm up, the engine warm up or running in a very cold situation, the idle state in which the switchover mechanism 114 is in the neutral position and the trolling state in which the switchover mechanism 114 is in the forward position but the engine operates still in the idle state. As aforenoted, the ECU selects one of the preset idle speeds in response to the current engine condition and control the opening of the idle throttle valve to adjust an air amount to make an actual idle speed meet the preset idle speed.

When the throttle control lever on the steering handle 144 is not operated, i.e., in the idle state, the main throttle valves in the throttle bodies 154 are closed. The idle air charge, therefore, is supplied to the combustion chambers through the idle air supply unit 210 bypassing the main air intake passages 64. The air charge in the plenum chamber 62 goes to the housing of the ISC 214 or idle air control mechanism through the inlet bypass 216 and its amount is adjusted in response to the engine condition by the ISC 214. The adjusted air charge, then, goes to the idle air manifold 212 to be equalized therein before delivered to the respective outlet bypasses 218. Then, the air charge goes to the portions of the respective throttle bodies 154 that position downstream of the throttle valves through the outlet bypasses 218 and finally reaches the combustion chambers.

The air charge is mixed with the fuel charge sprayed by the fuel injectors 84 and fired by the spark plugs. The fuel charge has been also regulated in a suitable manner to make an appropriate air fuel ratio with the air charge. Burning of the air fuel charge moves the pistons down to rotate the crankshaft 56. If the rotational speed of the crankshaft 56, i.e., the idle speed, is faster than the preset speed, the ISC 214 activates the idle throttle valve toward the closed position and a smaller amount of air is supplied to reduce the idle speed. Meanwhile, if the rotational speed of the crankshaft 56, i.e., the idle speed, is slower than the preset speed, the ISC 214 activates the idle throttle valve toward the open position and a larger amount of air is supplied to increase the idle speed. The actual idle speed is, thus, controlled to be consistent with the preset idle speed.

As described above, all of the main air intake passages 64 have their own throttle valves. Because the air charges that flow through the respective intake passages 64 are separately controlled by the own throttle valves, this arrangement does not need a large space for the plenum chamber 62. In addition, the idle air manifold 212 is provided for supplying idle air charges to the combustion chambers additionally to the main air intake passages 64. The ISC 214 is attached to the idle air manifold 212 to control amounts of the air charges flowing through the idle air manifold 212. Since the idle air manifold 212 is provided separately from the main air intake passages 64 and air pressure of the air charge is equalized in the manifold 212 before delivered to the combustion chambers. The ISC 214 is provided on the idle air manifold 212 rather than the respective air intake passages 64, the system will not have any problem in controlling the air amounts even with the single ISC 214. No separate control maps are necessary for the ISC 214 in this arrangement accordingly.

Also, the sum of cross-sectional areas of the outlet bypasses 218 is greater than a cross-sectional area of the inlet portion of the inlet bypass 216 to the housing of the ISC 214. Because of this, the air flowing through the outlet bypasses 218 reduces its speed sufficiently and hence intake air pressures in the respective air passages 64 are almost equal to each other. The single ISC 214, therefore, will not cause any problems with the multiple air passages 64 and a common control map can be used for the ISC 214.

Figure 4:
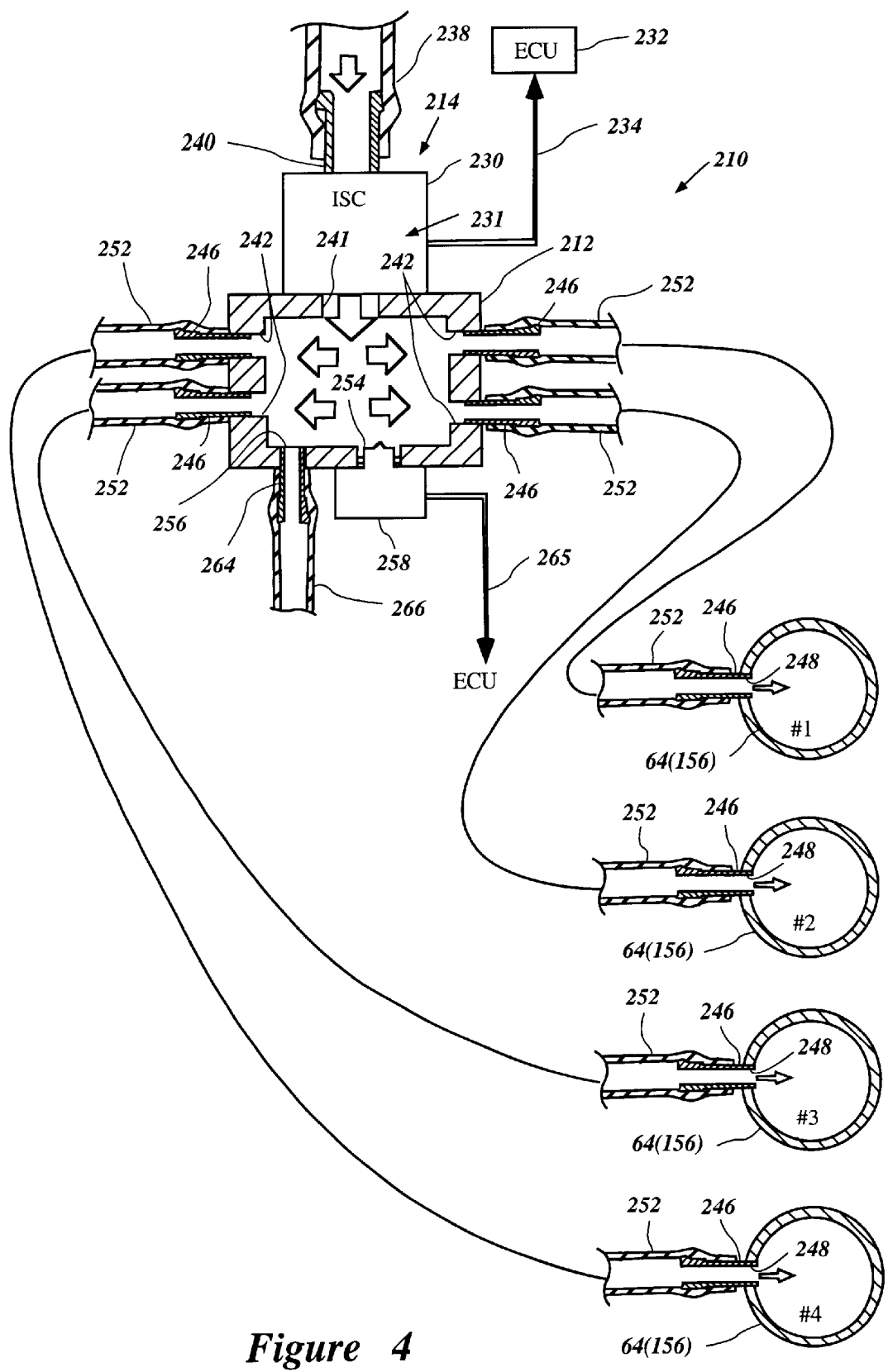
FIG. 4 is a schematic view showing an arrangement of an idle air supply unit with air intake passages in accordance with a second embodiment of the invention.

FIG. 4 illustrates another arrangement of the idle air supply unit 210 that connected to the main air intake passages 64 in accordance with a second embodiment of the present invention. The same members or components already described in connection with the first embodiment shown in FIG. 1 through 3 will be assigned with the same numerals. The other embodiments following this second embodiment will be described in the same manner.

The idle air manifold 212 may be affixed to the #1 and #2 runners 156 like in the arrangement of the first embodiment.

The housing of the ISC 214 is now designated with the reference numeral 230. The through-passage and the idle throttle valve are also provided therein. The aforenoted idle air control mechanism includes the housing 230, the though-passage, the idle throttle valve and an actuator of the idle throttle valve. The air control mechanism is now designated by the reference numeral 231. The ECU, which is also indicated with the reference numeral 232, is mounted on an appropriate wall portion of the engine 32 or located at any other place in the protecting cowlings 46, 48. The ECU 232 is connected to the idle air control mechanism 231 by a signal line 234, which is schematically indicated, and arranged to control the idle throttle valve, more specifically, the actuator.

An inlet conduit 238 made of elastic material such as synthetic rubber is connected to the ISC housing 230 by a nipple or joint member 240 made of metal. The inlet conduit 238 communicates with the plenum chamber 62, while the nipple 240 communicates with the through-passage in the ISC housing 230. The ISC housing 230 is mounted on and above the idle air manifold 212 in a suitable manner. An inlet port 241 is provided at the top side of the idle air manifold 212 and the other end of the through-passage communicates with the inlet port 241.

The idle air manifold 212 has four outlet ports 242 at both sides thereof. That is, a pair of outlet ports 242 are allotted at one side of the idle air manifold 212, while the other pair of outlet ports 242 are allotted at the other side of the manifold 212. The respective outlet ports 242 have nipples 246 which are also made of metal. The respective main air intake passages 64, in turn, have inlet ports 248 and nipples 246 are fitted into the inlet ports 248. The inlet ports 248 are positioned downstream of the throttle valves and may be formed at the runners 156. The nipples 246 of the idle air manifold 212 and the nipples 246 of the air intake passages 64 are connected together by four delivery conduits which are made of elastic material.

The idle air manifold 212 additionally has two openings 254, 256. An intake air pressure sensor 258 is affixed to and below the idle air manifold 212 so that its sensor tip is exposed to the interior of the manifold 212. The intake air pressure sensor 258 senses air pressure in the idle air manifold 212 through the opening 254. A signal from that the sensor 258 will be sent to the ECU 232 by a signal line 265 to adjust an amount of fuel sprayed into the combustion chambers.

A nipple 264 is fitted into the other opening 256 and an elastic conduit 266 is connected to this nipple 264. The other end of the elastic conduit 266 communicates with a fuel pressure regulator (not shown). A purpose in connecting the idle air manifold 212 with the fuel pressure regulator is to make a difference between the air pressure and the fuel pressure generally fixed at every engine speed, from low speed to high speed. This is advantageous for keeping the fuel injections under stable conditions.

Although the intake air pressure sensor 258 and the elastic conduit 266 are not shown in FIGS. 2 and 3, these members are provided in the arrangement of the first embodiment also.

Similar to the first embodiment, instead of the main air intake passages 64, the idle air manifold 212 can supply idle air charges to the combustion chambers, although the runners 156 are commonly used. Also, the ISC 214 is attached to the idle air manifold 212. Same as the first embodiment, because the idle air manifold 212 is provided separately from the main air intake passages 64 and air pressure of the air charge is equalized in the manifold 212 before delivered to the combustion chambers and the ISC 214 is provided on the idle air manifold 212 rather than the respective air intake passages 64, the system will not have any problem in controlling the air amounts even with the single ISC 214. No separate control maps are necessary for the ISC 214 in this arrangement also.

Alike the first embodiment, the sum of cross-sectional areas of the delivery conduits 252 are larger than a cross-sectional area of the inlet nipple 240. The same effect described above with the first embodiment is obtained with this embodiment. In addition to that, each cross-sectional area of the delivery conduit 252 is larger than each cross-sectional area of the nipple 246. This brings in more effective result because the length of the delivery conduit 252 is far longer than the length of the nipple 246. It should be noted that the sum of cross-sectional areas of the nipples 246 at the outlet ports 242 is, still larger than the cross-sectional area of the inlet nipple 240 in this arrangement.

Figure 5:
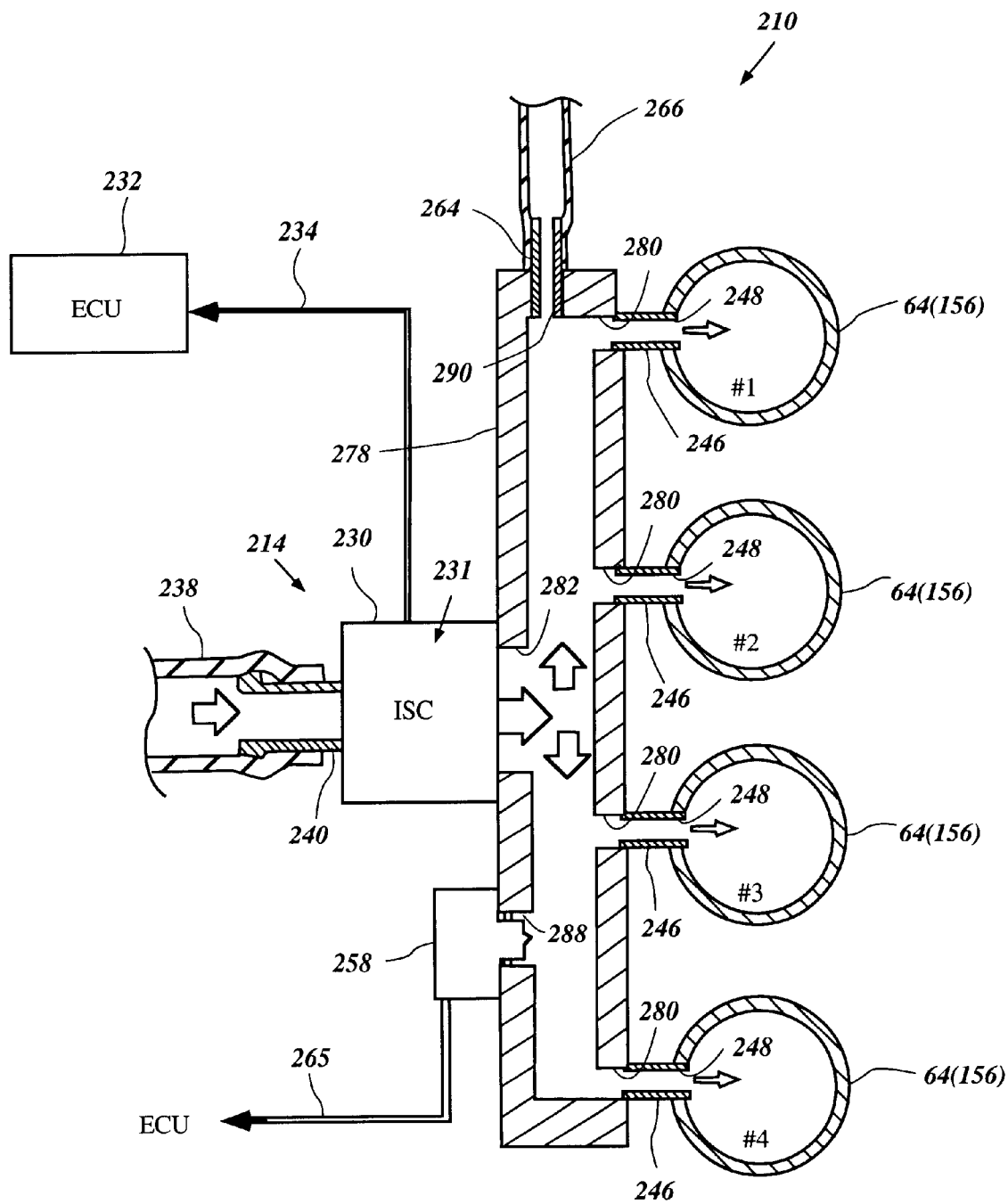
FIG. 5 is a schematic view showing an arrangement of the idle air supply unit with the air intake passages in accordance with a third embodiment of the invention.

FIG. 5 illustrates an arrangement it accordance with a third embodiment of the present invention.

In this arrangement, an air rail 278 is provided as the idle air manifold. The air rail 278 extends generally vertically and four outlet ports 280 are provided to be spaced apart evenly with each other on one side of the manifold 212 that faces the air intake passages 64, specifically, the runners 156. The intervals of the respective outlet ports 280 are equal to the intervals of the respective inlet ports 248 of the runners 156 and the air rail 278 is positioned in the proximity to the respective runners 156. Because of this, the outlet ports 280 of the air rail 278 are connected with the inlet ports 248 of the runners 156 directly by the nipples 246.

An inlet port 282 is provided on the other side of the air rail 278 at the center portion thereof. The intake air pressure sensor 258 is fitted into an opening 288 which is provided directly below the opening 282. The nipple 264 on which the delivery conduit 266 communicating with the regulator is fixed is fitted into an opening 290 provided at the top side of the air rail 278.

Figure 6:
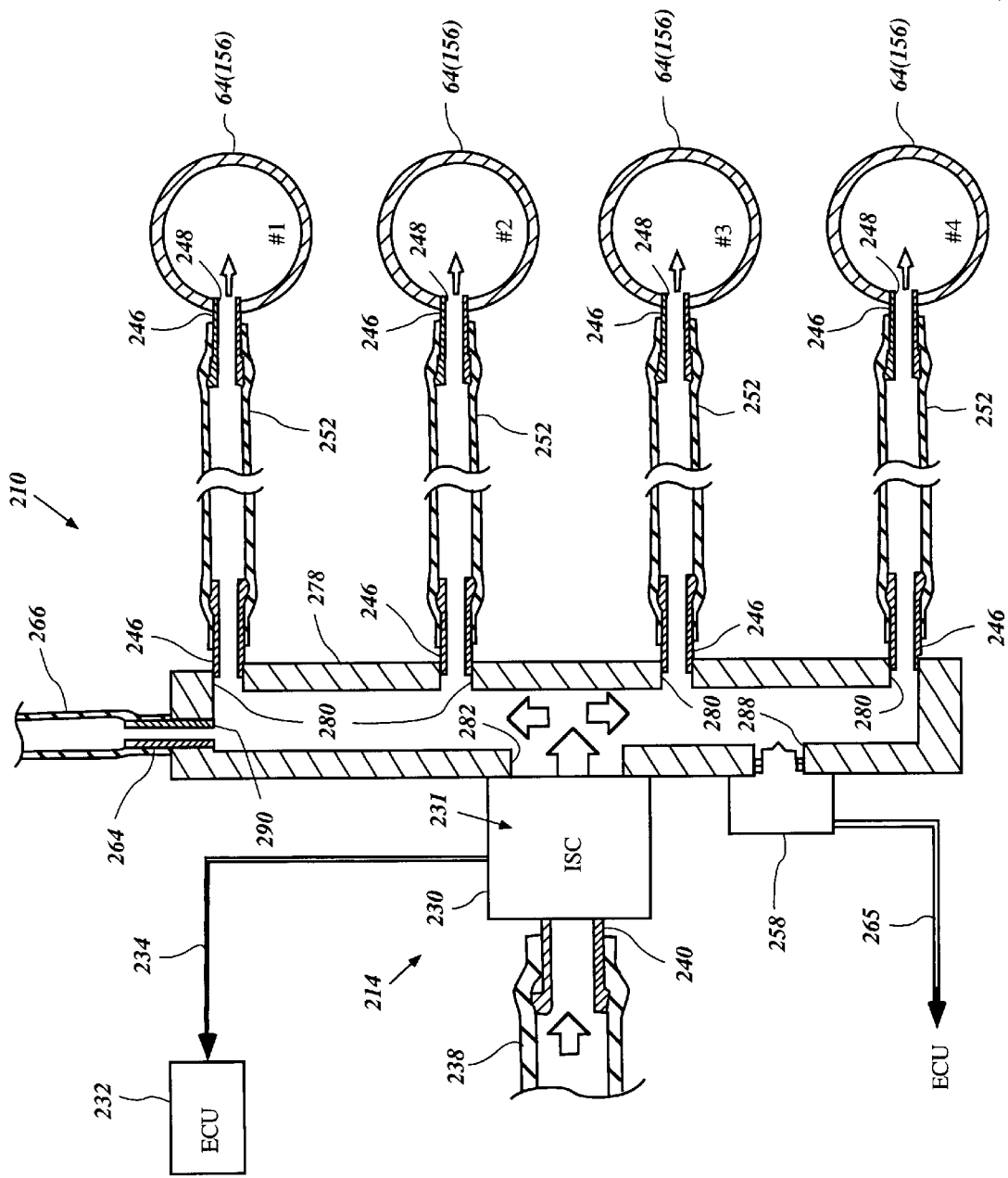
FIG. 6 is a schematic view showing an arrangement of the idle air supply unit with the air intake passages in accordance with a fourth embodiment of the invention.

FIG. 6 illustrates an arrangement in accordance with a fourth embodiment of the present invention.

The air rail 278 is again provided as the idle air manifold. The air rail 278 is spaced apart from the air intake passages 64 unlike the arrangement of the third embodiment. The nipples 246 fitted into the outlet ports 280 of the air rail 278 are, therefore, connected with the nipples 246 fitted into the inlet ports 248 of the respective runners 156 by the delivery conduits 252. The other part of this arrangement is the same as the residual part that excludes the connections from the arrangement shown in FIG. 5.

Figure 7:
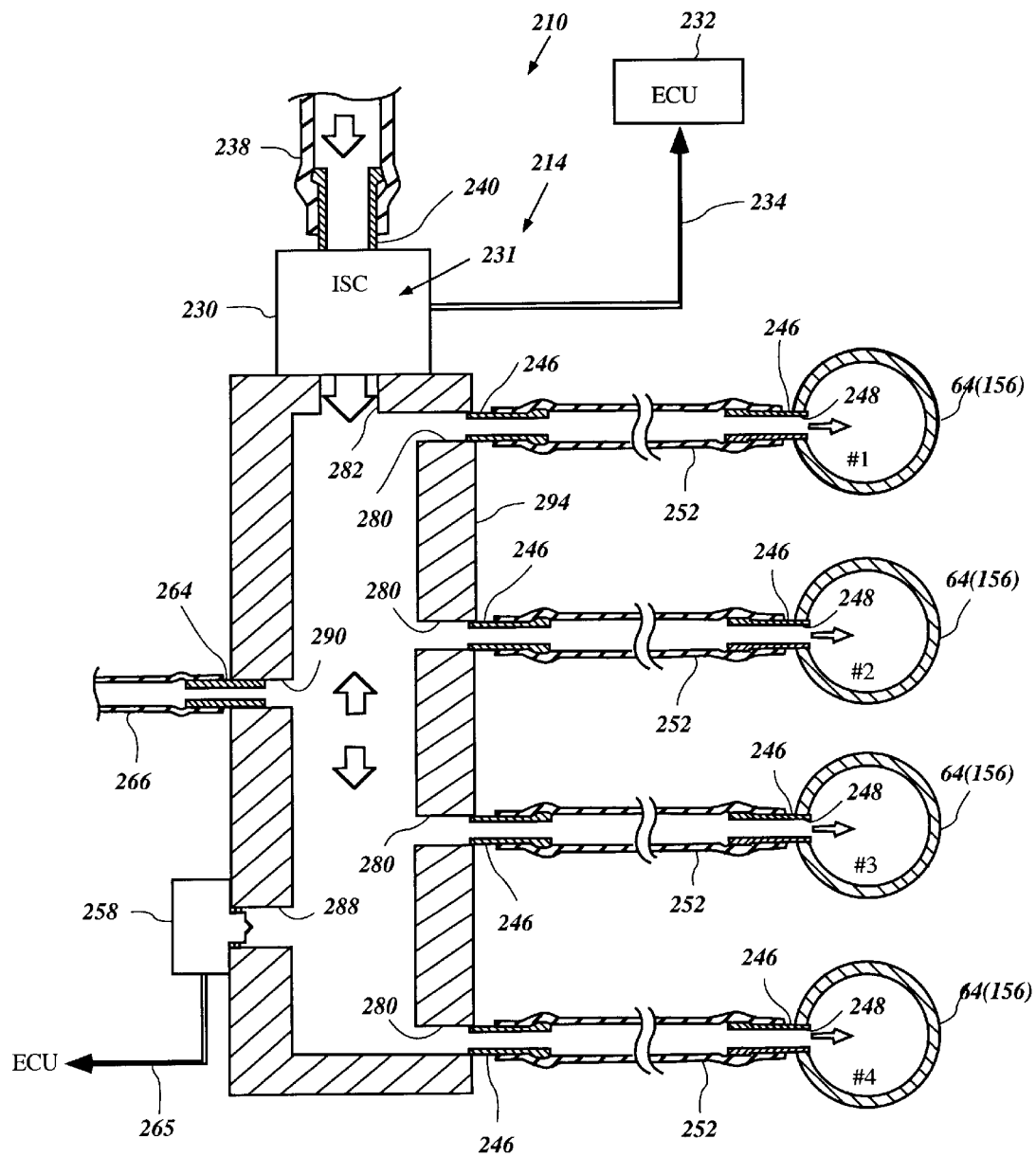
FIG. 7 is a schematic view showing an arrangement of the idle air supply unit with the air intake passages in accordance with a fifth embodiment of the invention.

FIG. 7 illustrates an arrangement in accordance with a fifth embodiment of the present invention.

A slightly larger air rail 294 is provided as the idle air manifold. The ISC housing 230 is positioned atop of the air rail 294. The delivery conduit 266 is affixed to the nipple 264 which is positioned at the center of the opposite side of the outlet ports 280. The other part of this arrangement is the same as the residual part of the arrangement shown in FIG. 6.

The location of the ISC housing 230 in this arrangement brings in a particular advantage. That is, because it is positioned atop of the air rail 294, the air charge passing through the inlet conduit 238 will not be affected by the heat that is held by the surrounding air which is stagnant at the bottom of the protective cowlings 46, 48. The air charge to the idle air manifold 294, therefore, will have a relatively low temperature that may equal to the atmospheric temperature. The density of the air charge will be relatively high accordingly.

Figure 8:
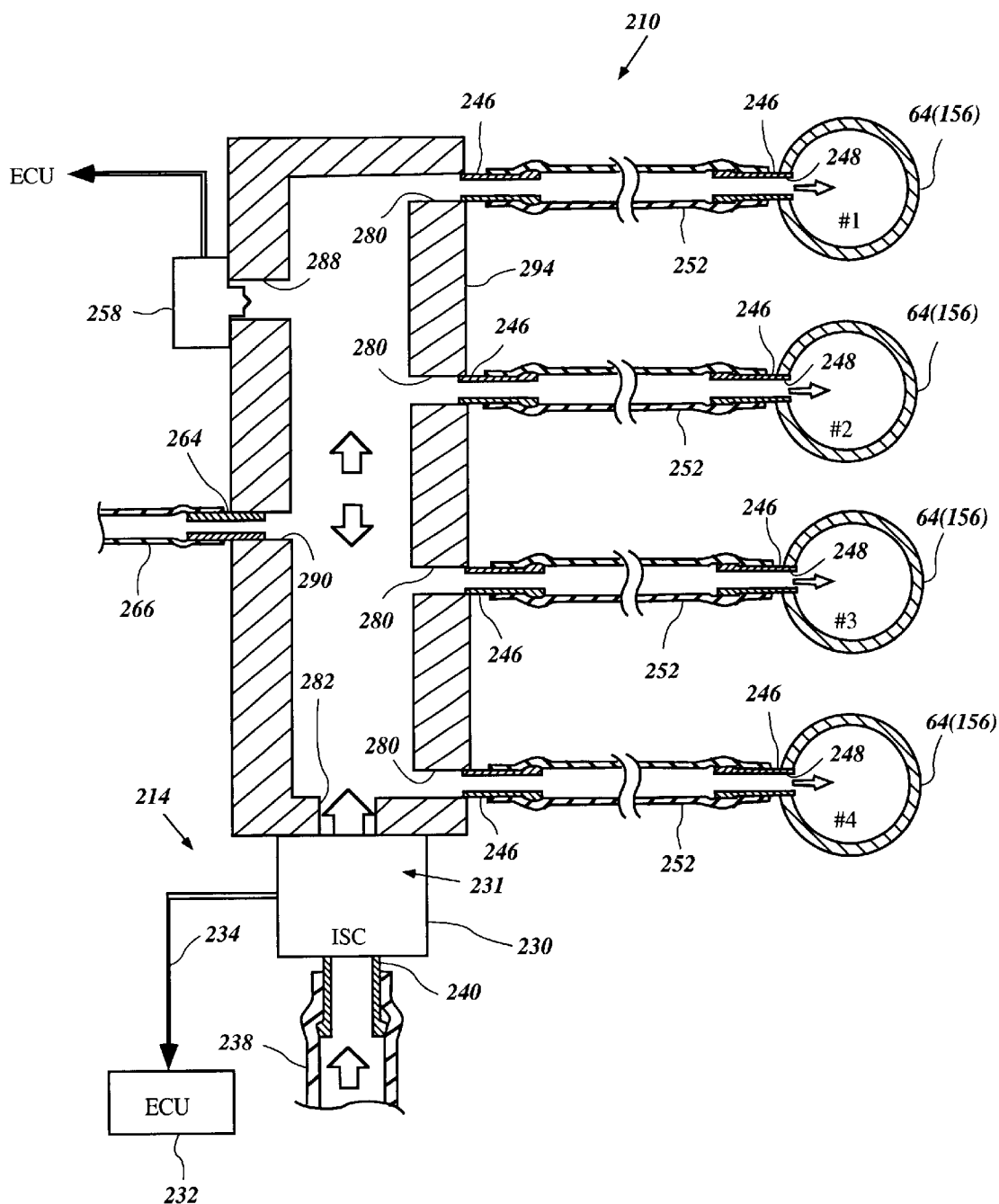
FIG. 8 is a schematic view showing an arrangement of the idle air supply unit with the air intake passages in accordance with a sixth embodiment of the invention.

FIG. 8 illustrates an arrangement in accordance with a sixth embodiment of the present invention.

The same air rail 294 is provided as the idle air manifold in this arrangement. Only difference between the arrangement of the fifth embodiment and this arrangement is that the ISC 214, the delivery conduit 266 and the intake air pressure sensor 258 in this arrangement are disposed upside down relative to the arrangement of the fifth embodiment.

The location of the ISC housing 230 in this arrangement results in another advantage. That is, the ISC 230 and the inlet conduit 238 does not projected upwardly. This can contribute for compactness and neatness of the engine 32.

Figure 9:
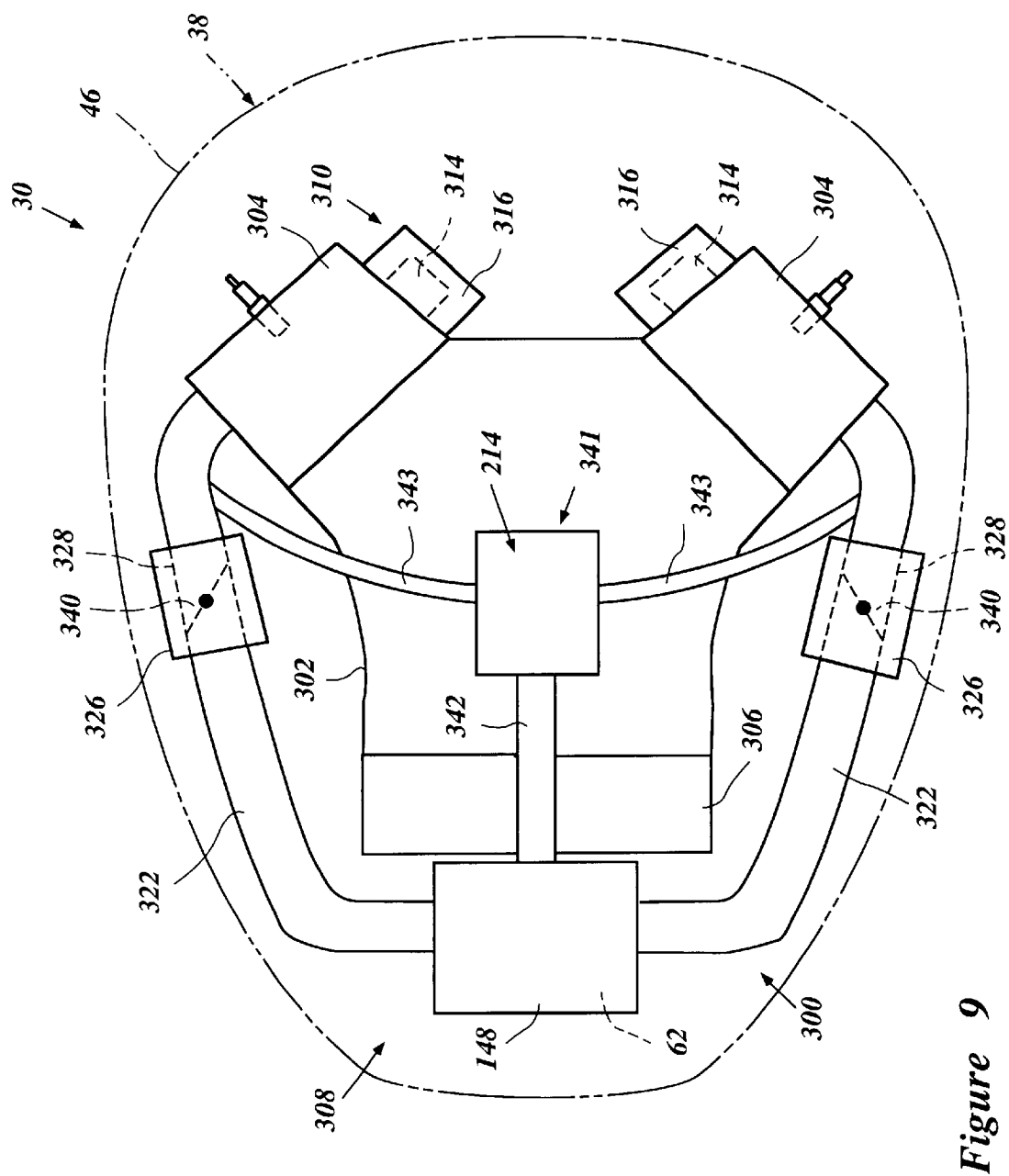
FIG. 9 is a schematic view showing another power head incorporating an arrangement of the idle air supply unit with the air intake passages in accordance with a seven embodiment of the invention. A protective cowling is shown in phantom.
Figure 10:
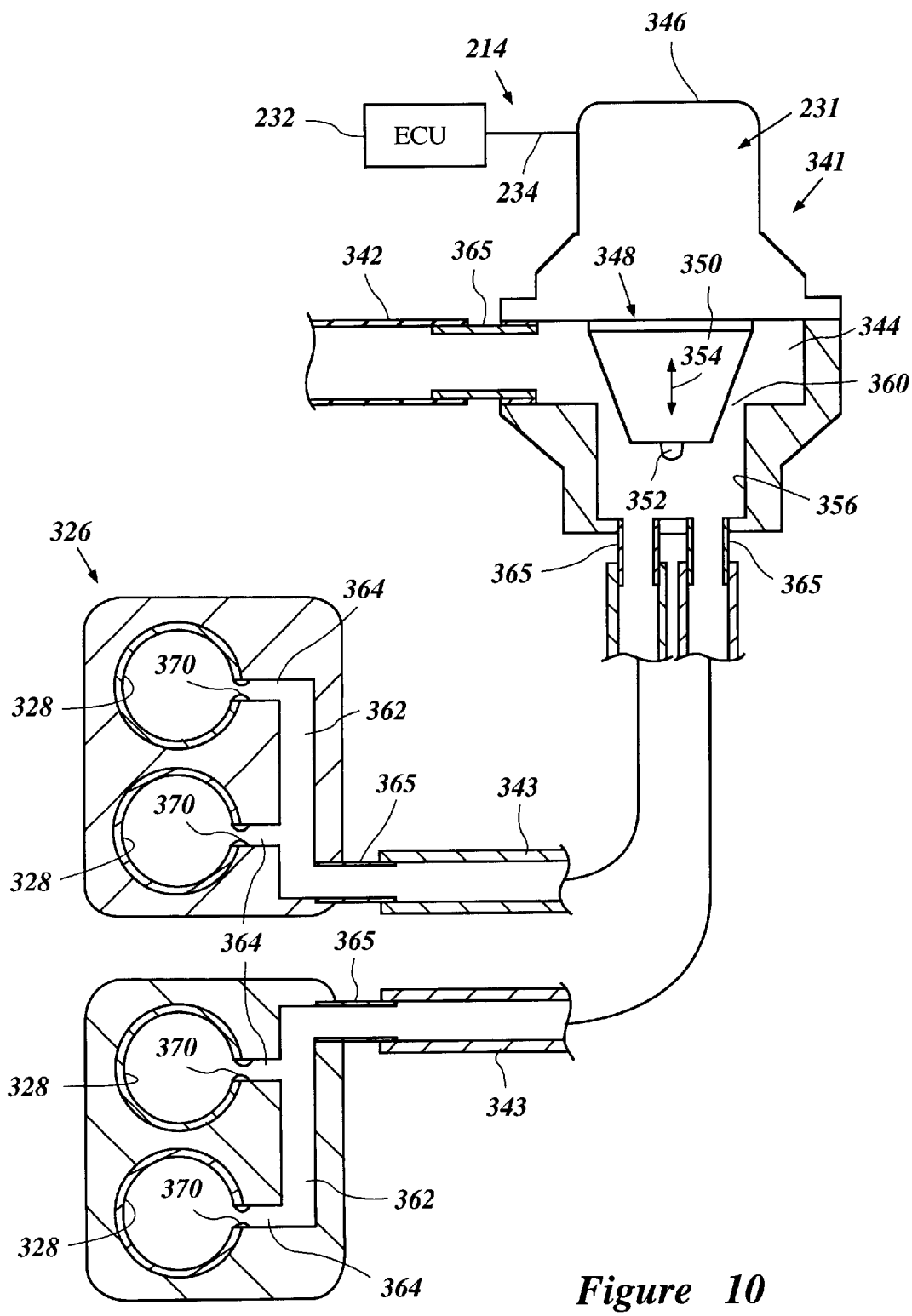
FIG. 10 is a schematic view showing the arrangement more in detail.

FIGS. 9 and 10 illustrate an arrangement in accordance with a seventh embodiment of the present invention.

An internal combustion engine 300, which is a different type from the aforedescribed engine 32, is employed for the power head 38. The other part of the outboard motor is the same as the motor 30 already described above. The engine 300 is a type of V4 and includes a pair of banks both having two cylinder bores. However, it still operates on a four stroke cycle principle. The engine 300 comprises a cylinder body 302 defining the cylinder bores in which pistons reciprocate. The cylinder bores disposed each bank are spaced apart generally vertically from each other and extend generally horizontally. A pair of cylinder head assemblies 304 are affixed to the respective banks of the cylinder body 302 to define combustion chambers with the cylinder bores and the pistons. A crankcase member 306 is affixed to the other side of the engine 300 to define a crankcase chamber with the cylinder body 302. A crankshaft, which rotates with the reciprocal movement of the pistons, extends generally vertically within the crankcase chamber.

An air induction system 308 is provided for supplying air charges to the combustion chambers. This air induction system 308 will be described shortly. An exhaust system 310 is also provided for discharging exhaust gasses from the combustion chambers. Exhaust manifolds 314 which collect exhaust gasses from respective exhaust ports are shown in FIG. 9. The exhaust manifolds 314 are enclosed by outer covers 316. Although the engine 300 further includes a direct fuel injection system and a firing system, these are omitted in FIG. 9. The functions of these systems are the same as the systems that are already described.

The air induction system 308 includes the plenum chamber member 148 defining the plenum chamber 62 therein. Two pairs of main air intake passages 322 extend from both sides of the plenum chamber member 148 and communicate with the plenum chamber 62. The air intake passages 322 disposed at each side are spaced apart generally vertically to each other. Also, they extend generally horizontally and rearwardly along the cylinder body 302 toward the combustion chambers. Intake ports are provided in the cylinder head assemblies 304 to accept end portions of the air intake passages 322.

Each of the air intake passages 322 has a throttle body 326 in which an air passage 328 is defined. The air passages 328 communicate with the respective air intake passages 322 so that air charges flow through the air intake passages 322 all the way form the plenum chamber 62 to the combustion chambers. Butterfly-type throttle valves 340 are pivotally affixed in the respective throttle bodies 326. Thus, amounts of the air charges supplied to the combustion chambers are regulated by the throttle valves 340 in response to various engine conditions.

Like in the already described arrangements, the air induction system 308 further includes an idle air supply unit 341. The idle air supply unit 341 is positioned above the cylinder body 302 and connected to the plenum chamber member 148 through an inlet bypass 342. Two outlet bypasses 343 extend from both sides of the idle air supply unit 341 and reach the respective main air intake passages 322 downstream of the throttle valves 340.

The idle air supply unit 341 is similar to the aforenoted idle supply unit 210. However, as seen in FIG. 10, the mechanical part of the ISC 214, i.e., idle air control mechanism 231 and an air manifold section 344 are unified together in a single housing 346. An idle throttle valve 348 projects into the air manifold section 344 from the idle air control mechanism 231. This idle throttle valve 348 in not a butterfly-type. The valve 348 has a downwardly narrower tapered portion 350 supported on a shaft 352. The shaft 352 is reciprocally movable along its axis as indicated by the double-headed arrows 354. Meanwhile, the housing 346 has an recess 356 into which the tapered portion 350 enters. Because of this construction, an area of a gap 360 between the tapered portion 350 and the top of the recess 356 changes with the reciprocal movement of the valve 348 and air amounts passing through the gap 360 is adjusted. The reciprocal movement of the valve 348 is controlled by the ISC 214 with an actuator which is not shown. The aforenoted intake air pressure sensor 258 and conduit 266 to the fuel regulator are provided in this arrangement also, although these are not shown.

Actually, the outlet bypasses 343 are connected to the throttle bodies 326 directly downstream of the throttle valves 340. As best seen in FIG. 10, the throttle bodies 326 on the same sides are unified with each other and the air passages 328 are defined therein and spaced apart generally vertically to each other. Delivery paths 362 are also defined therein to connect the outlet bypasses 343 with the air passages 328. The delivery paths 362 further diverge to form inlet paths 364 and then connected to the air passages 328.

The inlet bypass 342 and the outlet bypasses 343 are made of elastic material such as synthetic rubber. Nipples 365 made of metal are again used for connecting the inlet and outlet bypasses 342, 343 to the housing 346 and the respective throttle bodies 326.

As described above, if an amount of air charge supplied by the idle air supply unit 341 is excessive, idle speed of the engine 308 increases higher than a certain speed that may give rise to impossibility of the operation of the changeover mechanism 114.

Figure 11:
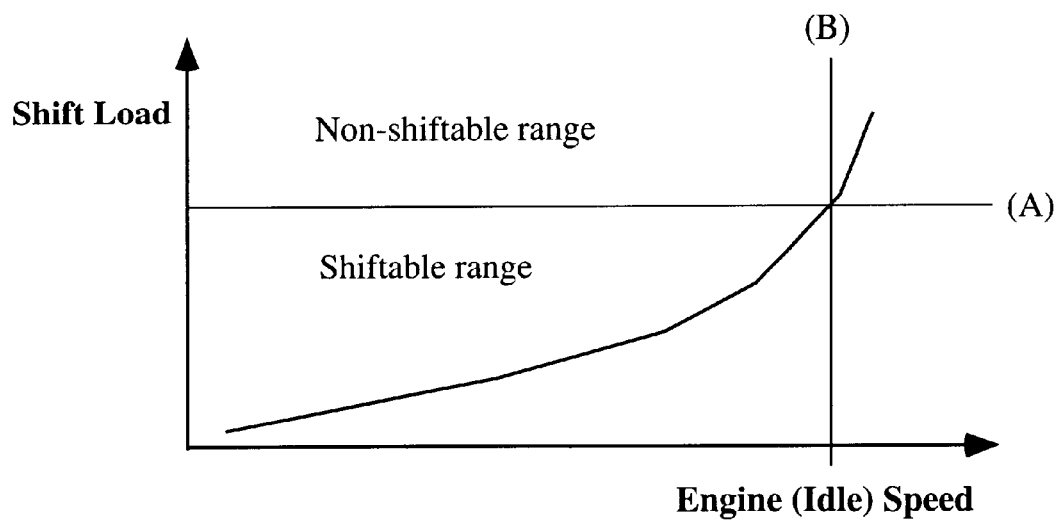
FIG. 11 is a graphical view showing a relationship between idle speeds and shift loads of an switchover mechanism.

FIG. 11 illustrates a relationship between an idle speed and a shift load of the changeover mechanism 114. When the idle speed becomes larger, the shift load also becomes larger. The change rate of this characteristic curve also becomes larger with the increase of the idle speed. If this characteristic curve exceeds over the line (A), the shift operation is no longer possible. The line (B) indicates the idle speed over which the shift operation is impossible. Particularly, since the outboard motor 30 employs the dog clutch, the shift operation from the forward (or reverse) position to the neutral position is likely to be difficult or impossible. Positions of the border lines (A) and (B) depend on shapes of the dog clutches, constructions of the switchover mechanisms, torque of engines and other various reasons.

Returning back to FIG. 10, the inlet paths 364 have restrictions or orifices 370 directly upstream of the air passages 328 in order to improve the situation in the shift operation. Air charges supplied to the combustion chambers through the air passages 328 are surely regulated by the restrictions 370 before entering the passages 328. The diameters of the restrictions 370 are set to be the size that can permit air to flow therethrough to maintain the engine speed less than a predetermined speed. Because, as described above, the changeover mechanism 114 is shiftable within idle speeds less than the predetermined speed.

Figure 12:
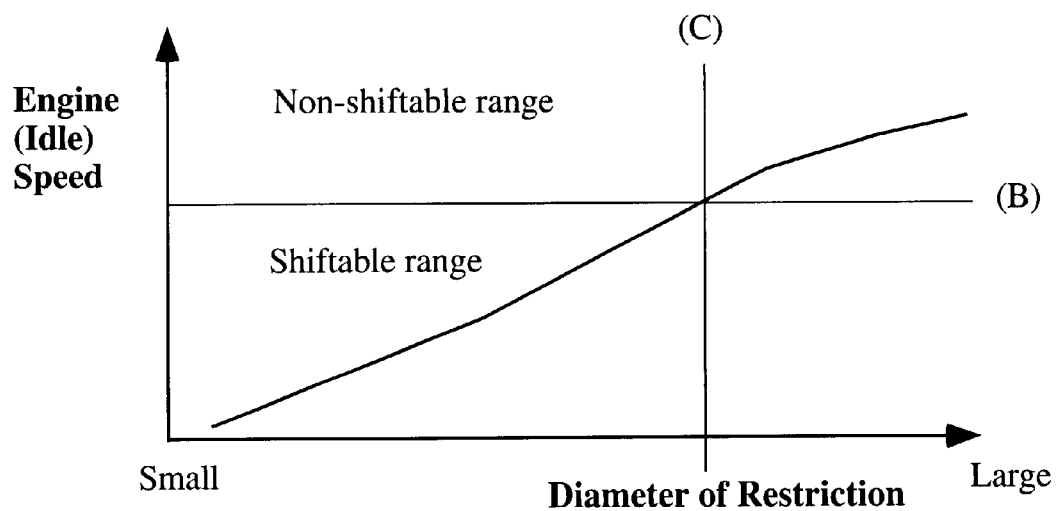
FIG. 12 is a graphical view showing a relationship between diameters of restrictions and the idle speeds.

With Reference to FIG. 12, the relationship between diameters of the restrictions 370 and the engine speeds. The engine speed increases almost in proportion to the diameters of the restrictions 370. When the diameter exceeds the line (C), the engine speed comes into the area where the shift operation by the changeover mechanism 114 becomes impossible. The area of the engine speed is over the line (B) that is also shown in FIG. 11. This means that, inasmuch as the engine speed is regulated less than the line (B), the changeover mechanism 114 is always shiftable and that, in order to regulate the engine speed less than the line (B), the diameter of the restriction 370 should be less than the line (C). The engine speed on the line (B) is the predetermined speed.

The diameters of the restrictions 370, on the other hand, should be a size larger than the size that can afford air amounts required for the engine start, engine warming up or running particularly under very cold conditions, maintaining idle states, preventing the engine from stalling and other various situations. The diameters of the restrictions 370 are, thus, determined to be less than the value on the line (C) and larger than the value that will be suited to such various situations by experiments or other proper methods.

Because of the restrictions 370, amounts of idle air will never be increased over the regulated value and the shift operation by the switchover mechanism 114 will be surely made. As a result, even though disconnection or damage of the elastic conduits 343 or seizure or damage of the ISC mechanism 231 would occur, the idle speed of the engine would never exceed the predetermined speed irrespective of the intention of the operator.

Although the restrictions 370 can be disposed at any positions between the idle throttle valve 348 and the inlet portions to the air passages 328 from the inlet paths 364, it is desirable to be positioned directly upstream of the inlet portions to the air passages 328 in the inlet paths 364. In addition, this directly upstream arrangement is useful for preventing air intake conditions in respective air passages 328 from affecting the other passages 328.

Figure 13:
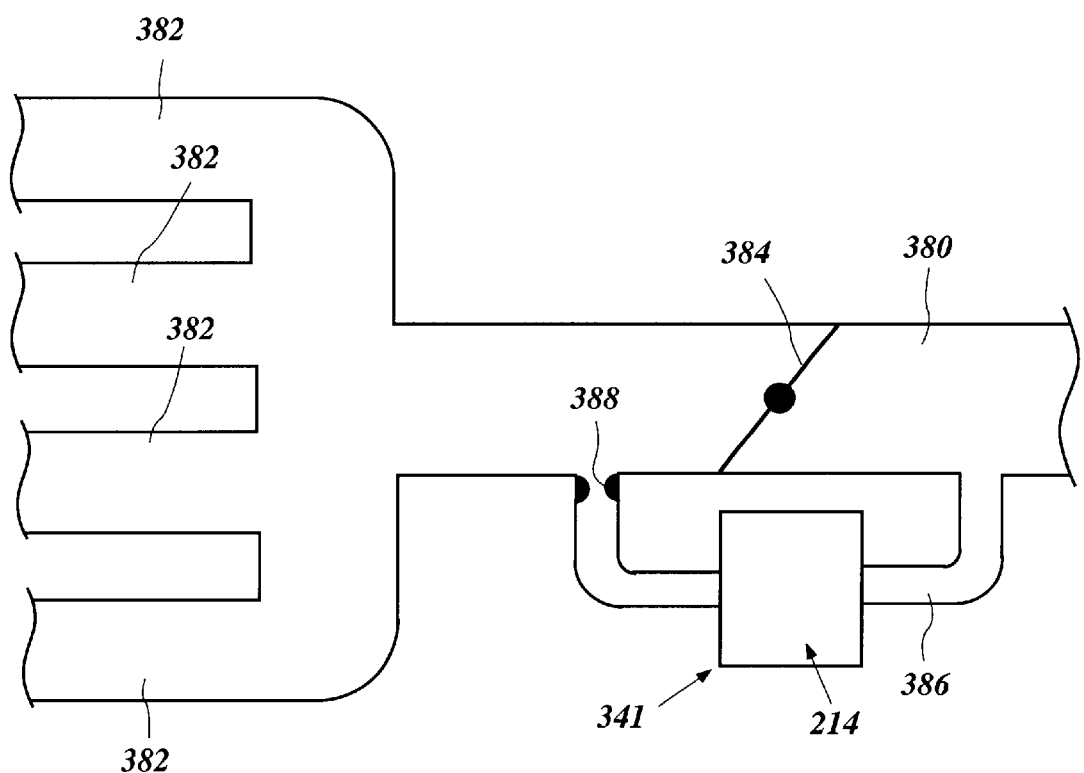
FIG. 13 is a schematic view showing an arrangement of the idle air supply unit with an air manifold and the air intake passages in accordance with an eighth embodiment of the invention.

FIG. 13 illustrates an arrangement in accordance with an eighth embodiment of the present invention.

A main air manifold 380 is provided upstream of main air intake passages 382 and communicates with the aforenoted plenum chamber 62. In other words, the air intake passages 382 diverge from the air manifold 380 downstream thereof. A main throttle valve 384 is disposed in the air manifold 380. Because of this, the air intake passages 382 have no throttle valves therein. An idle air passage 386 extends along the air manifold 380. The idle air passage 386 is connected to the air manifold 380 at two portions so as to communicate with the manifold 380 at the upstream and downstream portions of the throttle valve 384. That is, the idle air passage 386 bypasses the throttle valve 384. The idle air supply unit 341 including the ISC 214 is provided in the idle air passage 386. A restriction or orifice 388 is disposed downstream of the idle air passage 386 directly upstream of the portion where the idle air passage 386 communicates with the air manifold 380. The aforenoted intake air pressure sensor 258 and conduit 266 to the fuel regulator are again provided in this arrangement, although these are not shown also.

The function of this restriction 388 is the same as that of the restrictions 370 and air amounts flowing into the air manifold 380 from the idle air passage 386 is regulated by the restriction 388. Thereby, the switchover mechanism 114 can be surely operated. In addition, this arrangement is quite simple because idle air control can be made only with a single idle air passage 386 having the single idle air supply unit 341 and also the single restriction 388.

As described above, the respective air intake passages have their own throttle valves. Thus, the air induction system does not become large. In addition, the idle air manifold is provided and the feedback control system or ISC is arranged to control amounts of the air charges that flow through the idle air manifold. The control of the ISC mechanism is simple and easy accordingly.

Also, the sum of cross-sectional areas of the delivery passages that diverge from the idle air manifold is greater than a cross-sectional area of the inlet portion of the air manifold. Since the air that pass through the delivery passages reduces its speed sufficiently, intake air pressures in the respective air passages 64 are almost equal to each other. Therefore, no unstable condition will occur with the ISC.

Further, the respective delivery passages have restrictions upstream of the junctions to the intake air passages. As a result, excessive air will not be supplied to the combustion chambers in the idle state. The idle speed, hence, will not exceed a permissible range on any occasions.

Of course, the foregoing description is that of preferred embodiments of the invention, and various changes and modifications may be made without departing from the spirit and scope of the invention, as defined by the appended claims.

What is claimed is:

1. An internal combustion engine comprising a cylinder body defining a plurality of cylinder bores in which pistons reciprocate, a cylinder head affixed to an end of said cylinder body and defining combustion chambers with said pistons and said cylinder bores, a plurality of air intake passages supplying air charges to said combustion chambers, said air intake passages being spaced generally vertically relative to each other, each one of said air intake passages including a throttle valve arranged to control an amount of the air charge that flows through each one of said air intake passages, an idle air manifold supplying air charges to said combustion chambers, and a feedback control system arranged to control amounts of the air charges that flow through said idle air manifold based upon a difference between a preset idle speed and an actual idle speed of said engine.

2. An internal combustion engine as set forth in claim 1, wherein the actual idle speed changes generally in proportion to the amounts of the air charges that flow through said idle air manifold.

3. An internal combustion engine as set forth in claim 1, wherein said feedback control system includes an idle air control mechanism arranged to supply the air charges to said idle air manifold.

4. An internal combustion engine as set forth in claim 3, wherein said idle air control mechanism is positioned upstream of said idle air manifold.

5. An internal combustion engine as set forth in claim 4, wherein said idle air control mechanism is placed on one side of said idle air manifold.

6. An internal combustion engine as set forth in claim 5, wherein said idle air manifold has outlet ports corresponding to said air intake passages on one side of said idle air manifold, and said idle air control mechanism is placed at the opposite side of said outlet ports.

7. An internal combustion engine as set forth in claim 5, wherein said idle air manifold includes outlet ports spaced generally vertically relative to each other, each one of said outlet ports corresponds to each one of said air intake passages, said outlet ports and said air intake passages being connected, respectively, said idle air control mechanism being disposed at generally a center position of said outlet ports.

8. An internal combustion engine as set forth in claim 7, wherein said respective outlet ports are disposed at generally even intervals.

9. An internal combustion engine as set forth in claim 4, wherein said idle air control mechanism is placed above said idle air manifold.

10. An internal combustion engine as set forth in claim 4, wherein said idle air control mechanism is placed below said idle air manifold.

11. An internal combustion engine as set forth in claim 4, wherein said idle air control mechanism includes an inlet port, said idle air manifold includes outlet ports corresponding to said air intake passages, said outlet ports and said air intake passages are connected by delivery conduits, and the sum of cross-sectional areas of said delivery conduits is greater than a cross-sectional area of said inlet port.

12. An internal combustion engine as set forth in claim 11, wherein said outlet ports have joint members communicating with said delivery conduits, and a cross-sectional area of each one of said delivery conduits is greater than a cross-sectional area of each one of said joint members.

13. An internal combustion engine as set forth in claim 3, wherein said idle air control mechanism includes an idle air passage and an idle throttle valve positioned in said idle air passage, and said feedback control system controls an opening of said idle throttle valve.

14. An internal combustion engine as set forth in claim 13, wherein said feedback control system includes an idle speed sensor arranged to sense a rotational speed of a crankshaft as the idle speed, said crankshaft is rotated by the reciprocal movement of said pistons, means for comparing the actual idle speed sensed by said idle speed sensor with the preset idle speed, and means for controlling the opening of said idle throttle valve based upon an output of said comparing means.

15. An internal combustion engine as set forth in claim 14, wherein said engine has a fuel injection system arranged to supply fuel to said combustion chambers, an air pressure sensor arranged to sense an air pressure in said idle air manifold, and an amount of the fuel is adjusted by said fuel injection system based upon a signal from said air pressure sensor.

16. An internal combustion engine as set forth in claim 15, wherein said air pressure sensor is affixed to said idle air manifold.

17. An internal combustion engine as set forth in claim 15, wherein said fuel injection system includes a fuel regulator, said fuel regulator is connected to said idle air manifold to receive air pressure therein, and said fuel regulator adjusts pressure of the fuel supplied to said combustion chamber based upon the air pressure.

18. An internal combustion engine as set forth in claim 1, wherein said engine further comprises delivery conduits connecting said idle air manifold with said air intake passages downstream of said throttle valves.

19. An internal combustion engine as set forth in claim 18, wherein said delivery conduits are connected to each one of said intake passages.

20. An internal combustion engine as set forth in claim 18, wherein said delivery conduits includes elastic portions.

21. An internal combustion engine as set forth in claim 18, wherein each one of said delivery conduits has a cross-sectional area through which an amount of air is regulated.

22. An internal combustion engine as set forth in claim 18, wherein each one of said delivery conduits has a restriction.

23. An internal combustion engine as set forth in claim 1, wherein said idle air manifold is connected to said respective air intake passages directly by joint members.

24. An internal combustion engine as set forth in claim 1, wherein said idle air manifold includes outlet ports spaced generally vertically relative to each other, each one of said outlet ports corresponds to each one of said air intake passages, said outlet ports and said air intake passages being connected together, repectively.

25. An internal combustion engine as set forth in claim 24, wherein said idle air manifold is disposed in the proximity of said air intake passages, and said respective outlet ports and said respective air intake passages are connected by joint members made of metal.

26. An internal combustion engine as set forth in claim 24, wherein said respective outlet ports and said respective air intake passages are connected by delivery conduits made of elastic material.

27. An internal combustion engine as set forth in claim 1, wherein said engine further comprises a fuel injection system arranged to supply fuel into said combustion chambers.

28. An internal combustion engine as set forth in claim 1 in combination with a marine propulsion device, wherein said engine powers said marine propulsion device.

29. An internal combustion engine comprising a cylinder body defining a plurality of cylinder bores in which pistons reciprocate, a cylinder head affixed to an end of said cylinder body and defining combustion chambers with said pistons and said cylinder bores, a plurality of air intake passages supplying air charges to said combustion chambers, each one of said air intake passages including a throttle valve arranged to control an amount of the air charge that flows through each one of said air intake passages, an idle air manifold supplying air charges to said combustion chambers, and a feedback control system arranged to control amounts of the air charges that flow through said idle air manifold based upon a difference between a preset idle speed and an actual idle speed of said engine, said air intake passages being connected to said idle air manifold with delivery conduits less than the number of said air intake passages.

30. An internal combustion engine comprising a cylinder body defining a plurality of cylinder bores in which pistons reciprocate, a cylinder head affixed to an end of said cylinder body and defining combustion chambers with said pistons and said cylinder bores, a plurality of air intake passages supplying air charges to said combustion chambers, each one of said air intake passages including a throttle valve arranged to control an amount of the air charge that flows through each one of said air intake passages, an idle air manifold supplying air charges to said combustion chambers, and a feedback control system arranged to control amounts of the air charges that flow through said idle air manifold based upon a difference between a preset idle speed and an actual idle speed of said engine, said air intake passages extending along said cylinder body, and said idle air manifold being placed between said air intake passages and said cylinder body.

31. An internal combustion engine as set forth in claim 30, wherein said idle air manifold is affixed on at least one of said air intake passages.

32. An internal combustion engine for a marine propulsion device comprising a cylinder body defining at least one cylinder bore in which a piston reciprocates, a cylinder head affixed to an end of said cylinder body and defining a combustion chamber with said piston and said cylinder bore, at least one air intake passage supplying an air charge to said combustion chamber, said air intake passage including a throttle valve arranged to control an amount of the air charge that flows through said air intake passage, an idle air passage bypassing said throttle valve to deliver idle air to said combustion chamber, and an idle air control system arranged to control an amount of an air charge that flows through said idle air passage, said idle air passage having a restriction through which the amount of the air charge is regulated, said marine propulsion device being shiftable at least between a neutral position and a forward position within an idle speed range less than a preset speed, and said restriction having a diameter with which the amount of the air charge maintains the idle speed less than the preset speed.

33. An internal combustion engine as set forth in claim 32, wherein said restriction is positioned in the proximity of a junction of said idle air passage to said air intake passage.

34. An internal combustion engine as set forth in claim 32, wherein said idle air passage is connected to said air intake passage downstream of said throttle valve.

35. An internal combustion engine as set forth in claim 32 additionally comprising a feed back control system, wherein said idle air control system has an idle throttle valve, and said feed back control system controls an opening of said idle throttle valve based upon a difference between an actual idle speed and a preset idle speed.

36. An internal combustion engine as set forth in claim 32, wherein the restriction is positioned downstream of said idle air control system.

37. An internal combustion engine for a marine propulsion device comprising a cylinder body defining a plurality of cylinder bores in which pistons reciprocate, a cylinder head affixed to an end of said cylinder body and defining combustion chambers with said pistons and said cylinder bores, a plurality of air intake passages supplying air charges to said combustion chambers, each one of said air intake passages having a throttle valve and arranged to control an amount of the air charge that flows through each one of said air intake passages, an idle air passage bypassing said throttle valves to deliver idle air to said combustion chambers, an idle air control system arranged to control amounts of air charges that flow through said idle air passage, said idle air passage including an idle air manifold and a plurality of idle air delivery conduits positioned downstream of said idle air manifold and corresponding to said respective air intake passages, each one of said idle air delivery conduits having a restriction through which the amount of the air charge is regulated, said marine propulsion device being shiftable at least between a neutral position and a forward position within an idle speed range less than a preset speed, and each one of the restrictions having a diameter with which the amount of the air charge maintains the idle speed less than the preset speed.

38. An internal combustion engine as set forth in claim 37, wherein said idle air manifold has an inlet, and the sum of cross-sectional areas of said idle air delivery conduits is greater than a cross-sectional area of said inlet.

39. An internal combustion engine comprising a cylinder body defining a plurality of cylinder bores in which pistons reciprocate, a cylinder head affixed to an end of said cylinder body and defining combustion chambers with said pistons and said cylinder bores, a plurality of air intake passages supplying air charges to said combustion chambers, each one of said air intake passages including a throttle valve arranged to control an amount of the air charge that flows through each one of said air intake passages, an idle air passage bypassing said throttle valves to deliver idle air to said combustion chambers, an idle air control system arranged to control an amount of an air charge that flows through said idle air passage, said idle air passage including an idle air manifold having an inlet portion and a plurality of idle air delivery conduits, said idle air delivery conduits diverging from said idle air manifold and communicating with said respective air intake passages, and the sum of cross-sectional areas of said idle air delivery conduits being greater than a cross-sectional area of said idle air manifold.

40. An internal combustion engine for a marine propulsion device comprising a cylinder body defining a plurality of cylinder bores in which pistons reciprocate, a cylinder head affixed to an end of said cylinder body and defining combustion chambers with said pistons and said cylinder bores, an air intake conduit supplying air charges to said combustion chambers, said air intake conduit including an upstream portion and a plurality of downstream portions branched off from the upstream portion toward said combustion chambers, said upstream portion having a throttle valve arranged to control amounts of the air charges that flow through said upstream portion, an idle air passage bypassing said throttle valve to deliver idle air to said downstream portions, an idle air control system arranged to control amounts of air charges that flow through said idle air passage, said idle air passage having a restriction through which the amount of the air charge is regulated, said marine propulsion device being shiftable at least between a neutral position and a forward position within an idle speed range less than a preset speed, and said restriction having a diameter with which the amount of the air charge maintains the idle speed less than the preset speed.

41. An internal combustion engine as set forth in claim 40, wherein said restriction is positioned downstream of the idle air control system.

42. An internal combustion engine comprising a cylinder body defining a plurality of cylinder bores in which pistons reciprocate, a cylinder head affixed to an end of the cylinder body and defining a plurality of combustion chambers with the pistons and the cylinder bores, a plurality of air intake passages supplying air to the combustion chambers, each one of the air intake passages including means for metering an amount of the air that flows through each one of the air intake passages, an idle air supply device bypassing the metering means, a control system arranged to control an amount of air that flows through the idle air supply device based upon a difference between a preset idle speed and an actual idle speed of the engine, and an air pressure sensor mounted on the idle air supply device to sense air pressure in the idle air supply device, the control system further controlling an operation of the engine based upon a signal from the air pressure sensor.

* * * * *